United States Patent
Zavitz

(10) Patent No.: US 9,420,885 B2
(45) Date of Patent: *Aug. 23, 2016

(54) PIPE RACKS

(71) Applicant: Tindall Corporation, Spartanburg, SC (US)

(72) Inventor: Bryant A. Zavitz, Dunwoody, GA (US)

(73) Assignee: TINDALL CORPORATION, Spartanburg, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/689,589

(22) Filed: Apr. 17, 2015

(65) Prior Publication Data

US 2016/0037914 A1    Feb. 11, 2016

Related U.S. Application Data

(63) Continuation of application No. 14/306,326, filed on Jun. 17, 2014, now Pat. No. 9,032,677.

(51) Int. Cl.

| E02D 27/32 | (2006.01) |
|---|---|
| A47B 57/12 | (2006.01) |
| E02D 27/02 | (2006.01) |
| B25H 1/06 | (2006.01) |
| F16B 11/00 | (2006.01) |
| F16L 3/22 | (2006.01) |

(52) U.S. Cl.
CPC .............. *A47B 57/12* (2013.01); *B25H 1/06* (2013.01); *E02D 27/02* (2013.01); *E02D 27/32* (2013.01); *F16B 11/006* (2013.01); *F16L 3/22* (2013.01)

(58) Field of Classification Search
CPC ....... E02D 27/32; E02D 27/02; E02D 27/42; A47B 81/005; A47B 47/021; E04G 11/14; E04G 13/023; E04G 11/02; E04G 17/002; E04G 17/14; E04H 12/22; E04H 12/2238; E04H 12/2253; E04H 12/2276; E04H 12/2246; E04H 12/2261; E04H 12/2269; E04H 12/2292; E04H 17/22; E04F 11/1812; E01D 18/00
USPC .......................... 52/294, 296, 299; 256/65.14
See application file for complete search history.

(56) References Cited

U.S. PATENT DOCUMENTS

| 2,413,990 A | 1/1947 | Vluntz |
| 2,574,711 A | 11/1951 | Rose |
| 2,718,362 A | 9/1955 | Bird |

(Continued)

FOREIGN PATENT DOCUMENTS

WO    2009157601 A1    12/2009

*Primary Examiner* — Joshua J Michener
*Assistant Examiner* — Keith Minter
(74) *Attorney, Agent, or Firm* — The Tracy IP Law Firm, PLLC

(57) ABSTRACT

A structure includes at least one foundation, two legs, a horizontal support, and an adhesive. The two legs are supported by the at least one foundation. Each of the two legs includes at least one aperture. The horizontal support has two ends. A first end is located in an aperture in a first leg of the two legs and a second end of the horizontal support is located in an aperture in a second leg of the two legs. The first end of the horizontal support has a cross-sectional area that is less than a cross-sectional area of the aperture in the first leg and the second end of the horizontal support has a cross-sectional area that is less than a cross-sectional area of the aperture in the second leg. The adhesive is within each aperture and in contact with the horizontal support.

18 Claims, 7 Drawing Sheets

(56) References Cited

U.S. PATENT DOCUMENTS

| | | | | |
|---|---|---|---|---|
| 2,783,029 A | | 2/1957 | Fisher et al. | |
| 3,845,594 A | * | 11/1974 | Butts | E04B 5/29 52/334 |
| 3,945,168 A | * | 3/1976 | Butts | E04B 5/29 248/351 |
| 4,177,968 A | * | 12/1979 | Chapman | E04C 3/07 249/211 |
| 4,229,919 A | * | 10/1980 | Hughes | A47C 11/00 264/31 |
| 4,386,762 A | * | 6/1983 | Collins | E04H 17/22 256/59 |
| 4,660,331 A | * | 4/1987 | Dahlen | E04B 5/43 52/283 |
| 4,889,322 A | * | 12/1989 | Wagner | E04H 17/08 256/36 |
| 5,613,664 A | * | 3/1997 | Svalbe | E04H 17/003 256/19 |
| 5,749,481 A | * | 5/1998 | Miller | A47B 96/1441 211/187 |
| 5,851,446 A | * | 12/1998 | Bardo | E04H 5/12 261/111 |
| 5,902,522 A | * | 5/1999 | Seawell | E04H 5/12 26/111 |
| 5,975,500 A | * | 11/1999 | Orton | E04H 12/2238 256/19 |
| 6,886,296 B1 | * | 5/2005 | John | E04H 12/2292 248/519 |
| 2004/0256609 A1 | * | 12/2004 | Mills | E04H 17/1413 256/65.12 |
| 2006/0156675 A1 | * | 7/2006 | Nelson | E04G 11/062 52/633 |
| 2006/0255327 A1 | * | 11/2006 | Johnston | A01K 3/00 256/59 |
| 2006/0266726 A1 | * | 11/2006 | Swanson | A47B 47/021 211/186 |
| 2007/0209314 A1 | * | 9/2007 | Vaughn | E02D 27/34 52/838 |
| 2009/0249660 A1 | * | 10/2009 | Brenize | E02D 27/02 37/407 |
| 2011/0283657 A1 | * | 11/2011 | Barrett | E04H 12/12 52/834 |
| 2013/0015151 A1 | * | 1/2013 | Wolfbauer | A01K 97/08 211/70.8 |
| 2013/0175427 A1 | * | 7/2013 | Moyher | E02D 19/00 249/18 |
| 2014/0183330 A1 | * | 7/2014 | Simmons | G01B 3/30 249/49 |

* cited by examiner

PIPE RACKS

CROSS REFERENCE TO RELATED APPLICATIONS

This application claims priority to and is a continuation of U.S. patent application Ser. No. 14/306,326, filed Jun. 17, 2014, which is incorporated by reference herein in its entirety.

FIELD OF THE INVENTION

The present subject matter relates generally to racks for supporting pipes, especially pipes at a refinery.

BACKGROUND OF THE INVENTION

Oil refineries include many chemical processing units, each removing one or more hydrocarbons from a mixture of many. Extensive piping runs between all of these processing units and various holding tanks. This piping is generally supported off the ground by steel racks. Each section of rack including two legs and at least one horizontal support bar is generally called a bent.

A first problem that arises with the present pipe racks is that if one of the pipes leaks liquid or gas that catches fire, an intense fire can cause the steel bent to lose its structural integrity. This will then cause the rest of the pipes on that bent to lose support, possibly rupturing the other pipes as well. This can cause a single leak to turn into a catastrophic fire and/or explosion. Thus, racks impervious to fire would avoid this problem.

Further, the location and orientation of each bent is very important to ensure the correct support of the pipe, including the correct slope to the pipe (if any). Steel bents require that the foundation of each leg be determined very accurately to ensure accurate placement of the bent. This is very time consuming, leading to greater cost and delay when building the refinery. Accordingly, a pipe rack that can be placed without such additional labor is desired.

SUMMARY OF THE INVENTION

The present invention broadly comprises a pipe rack and a method for making a pipe rack. In one embodiment, the pipe rack may include at least one foundation, two legs, a horizontal support, and an adhesive. The two legs are supported by the at least one foundation. Each of the two legs includes at least one aperture. The horizontal support has two ends. A first end is located in an aperture in a first leg of the two legs and a second end of the horizontal support is located in an aperture in a second leg of the two legs. The first end of the horizontal support has a cross-sectional area that is less than a cross-sectional area of the aperture in the first leg and the second end of the horizontal support has a cross-sectional area that is less than a cross-sectional area of the aperture in the second leg. The adhesive is within each aperture and in contact with the horizontal support.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION OF THE PREFERRED EMBODIMENTS

Reference is presently made in detail to exemplary embodiments of the present subject matter, one or more examples of which are illustrated in or represented by the drawings. Each example is provided by way of explanation of the present subject matter, not limitation of the present subject matter. In fact, it will be apparent to those skilled in the art that various modifications and variations can be made in the present subject matter without departing from the scope or spirit of the present subject matter. For instance, features illustrated or described as part of one embodiment can be used with another embodiment to yield a still further embodiment. Thus, it is intended that the present subject matter covers such modifications and variations as come within the scope of the disclosure and equivalents thereof.

Figure 1:
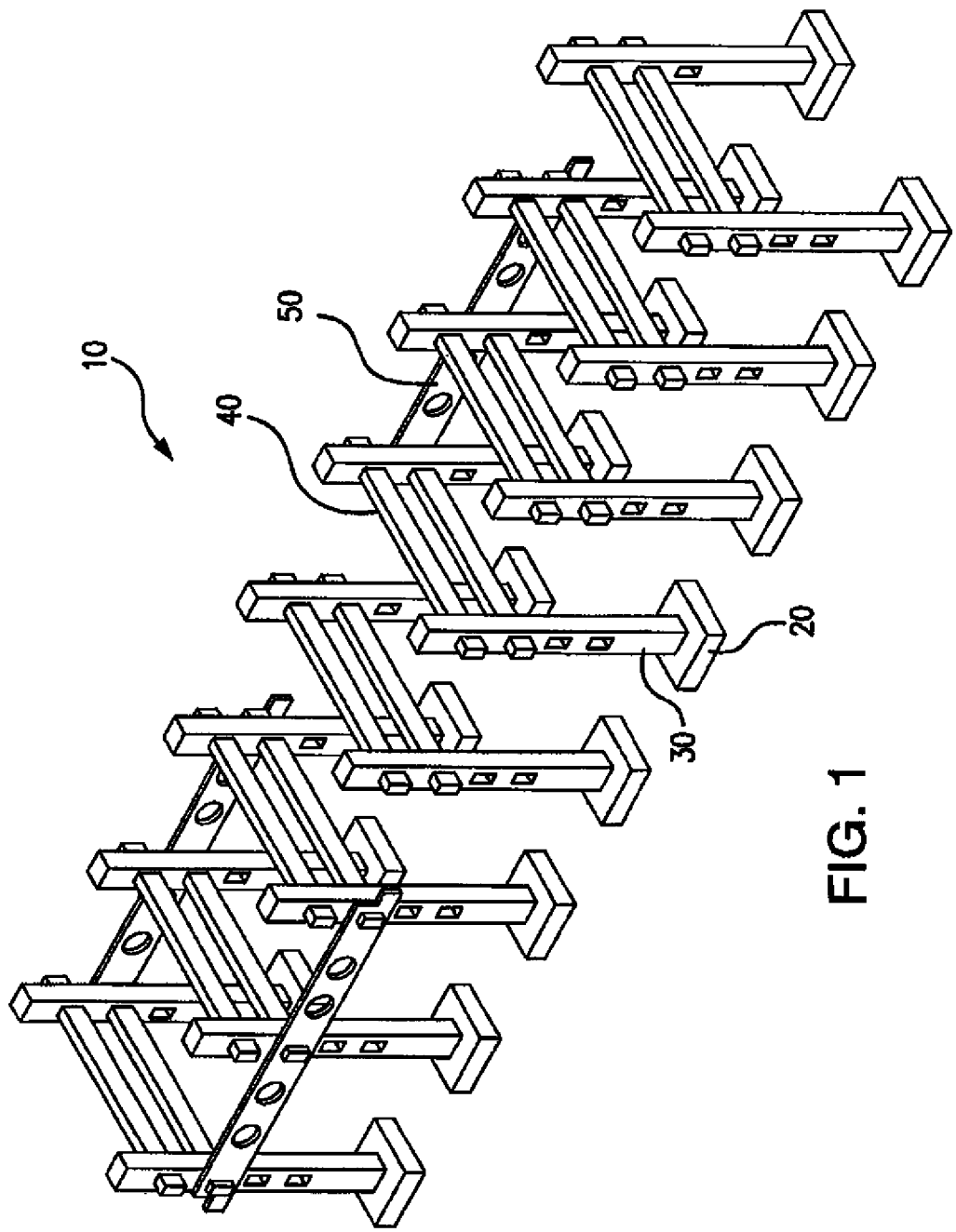
FIG. 1 illustrates a perspective view of a first embodiment of the present invention.

FIG. 1 shows a perspective view of a first embodiment of an apparatus 10 for supporting pipes in accordance with the present invention. Apparatus 10 may also support other equipment such as power lines, or other objects. Further, as described herein, apparatus 10 is made of pre-stressed concrete so as to be impervious to fire. However, pipe racks as described herein made of other materials such as other fire impervious materials are also within the scope of the present invention.

Figure 3:
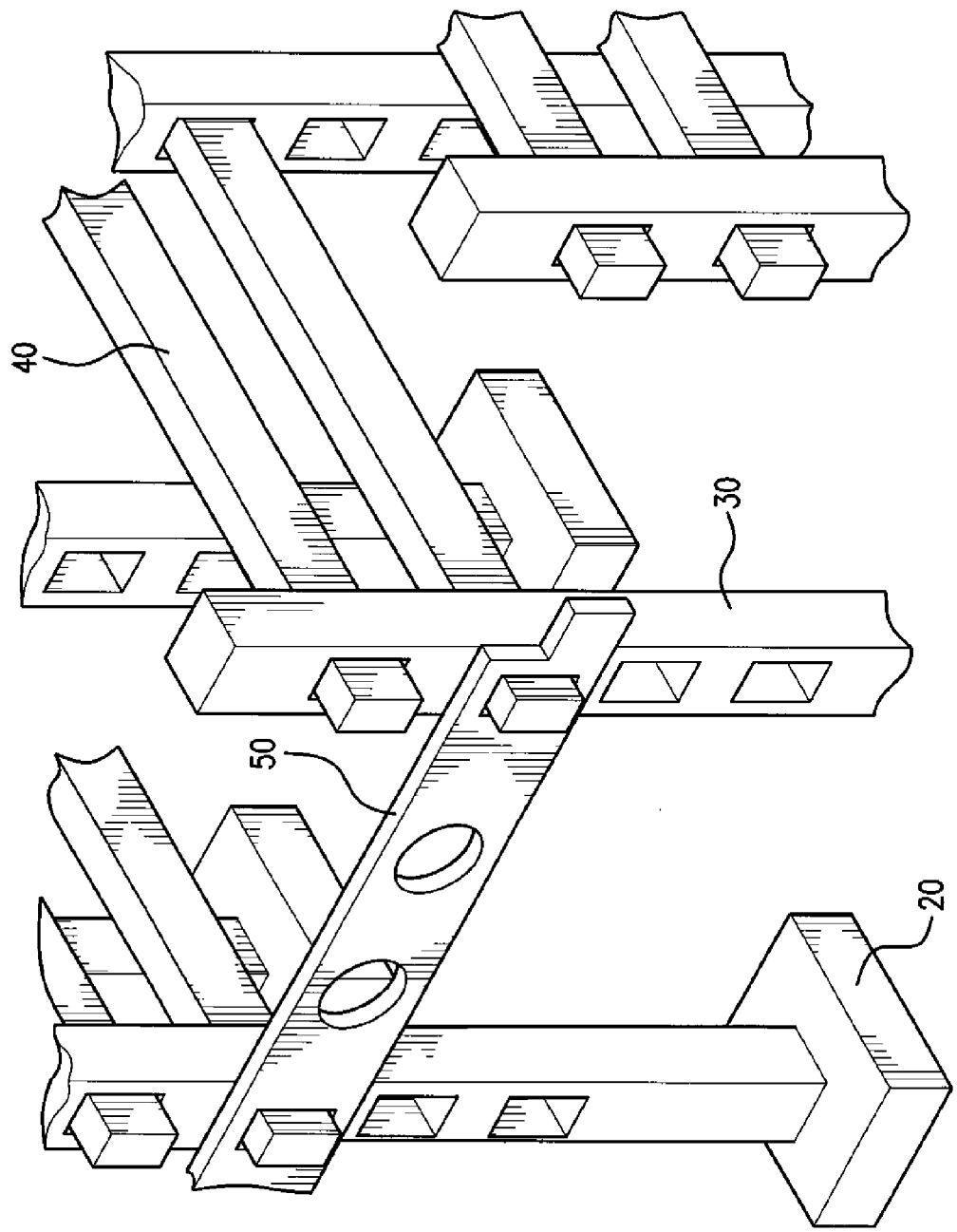
FIG. 3 illustrates a close up perspective view of a horizontal strut.

Apparatus 10 includes foundations 20, legs 30 located on foundations 20, horizontal supports 40, and horizontal struts 50 (shown in close up in FIG. 3). In the embodiment shown in FIG. 1, foundations 20 may be placed approximately 20 feet apart in the direction of the pipe, and approximately 25 feet apart in the direction perpendicular to the direction of the pipe. However, different or irregular distances are also within the scope of the invention.

FIG. 1 also shows that legs 30 have four apertures 32 for receiving horizontal supports 40, two of which include horizontal supports 40. Any number of apertures 32 or horizontal supports 40 are within the scope of the invention. Further, any number or length of horizontal struts 50 are also within the scope of the invention.

Figure 2:
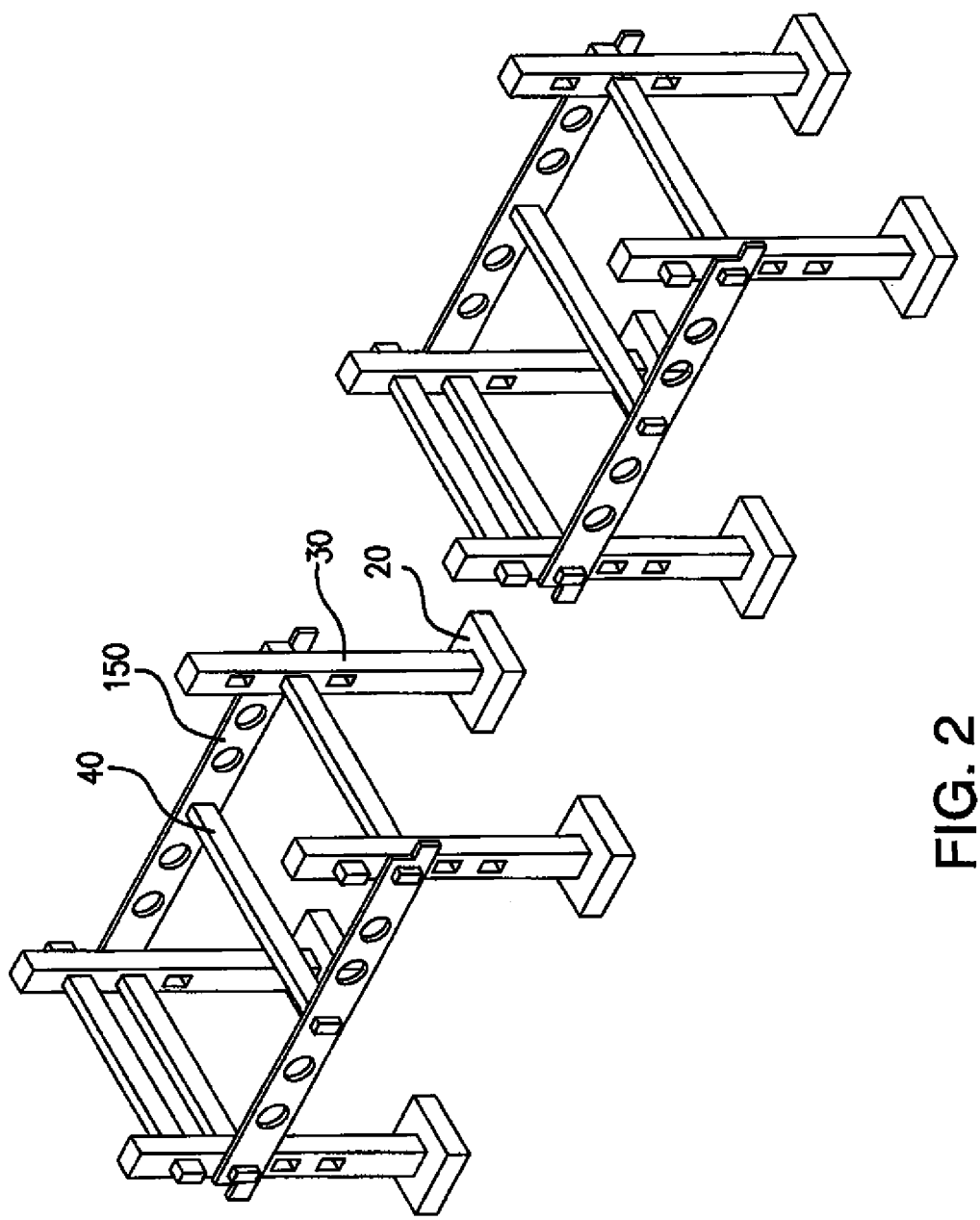
FIG. 2 is a perspective view of a second embodiment of the present invention.

FIG. 2 shows a second embodiment of the present invention, apparatus 110. Apparatus 110 includes foundations 20 placed at double the spacing shown in FIG. 1. Apparatus 110 also includes legs 30, horizontal supports 40, and horizontal struts 150. However, horizontal support 40 may also be supported by horizontal struts 150 at locations equidistant between foundations 20. Thus, the same spacing of horizontal supports 30 is maintained, while the number of foundations 20 is halved. This can dramatically increase construction speed, as laying the foundations can be very labor intensive.

Figure 5:
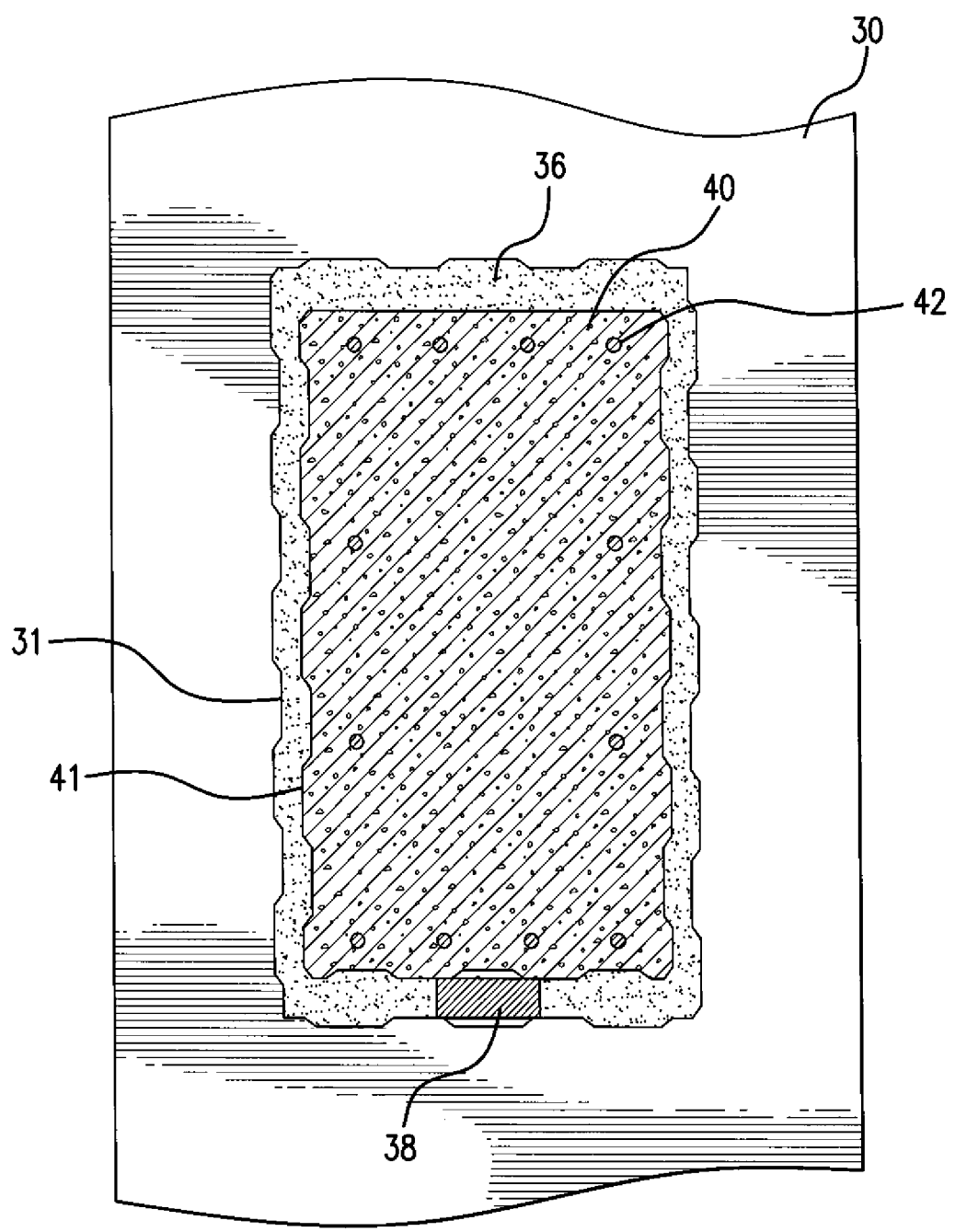
FIG. 5 is a side view of a first embodiment of the joint between the leg and the horizontal support.
Figure 7:
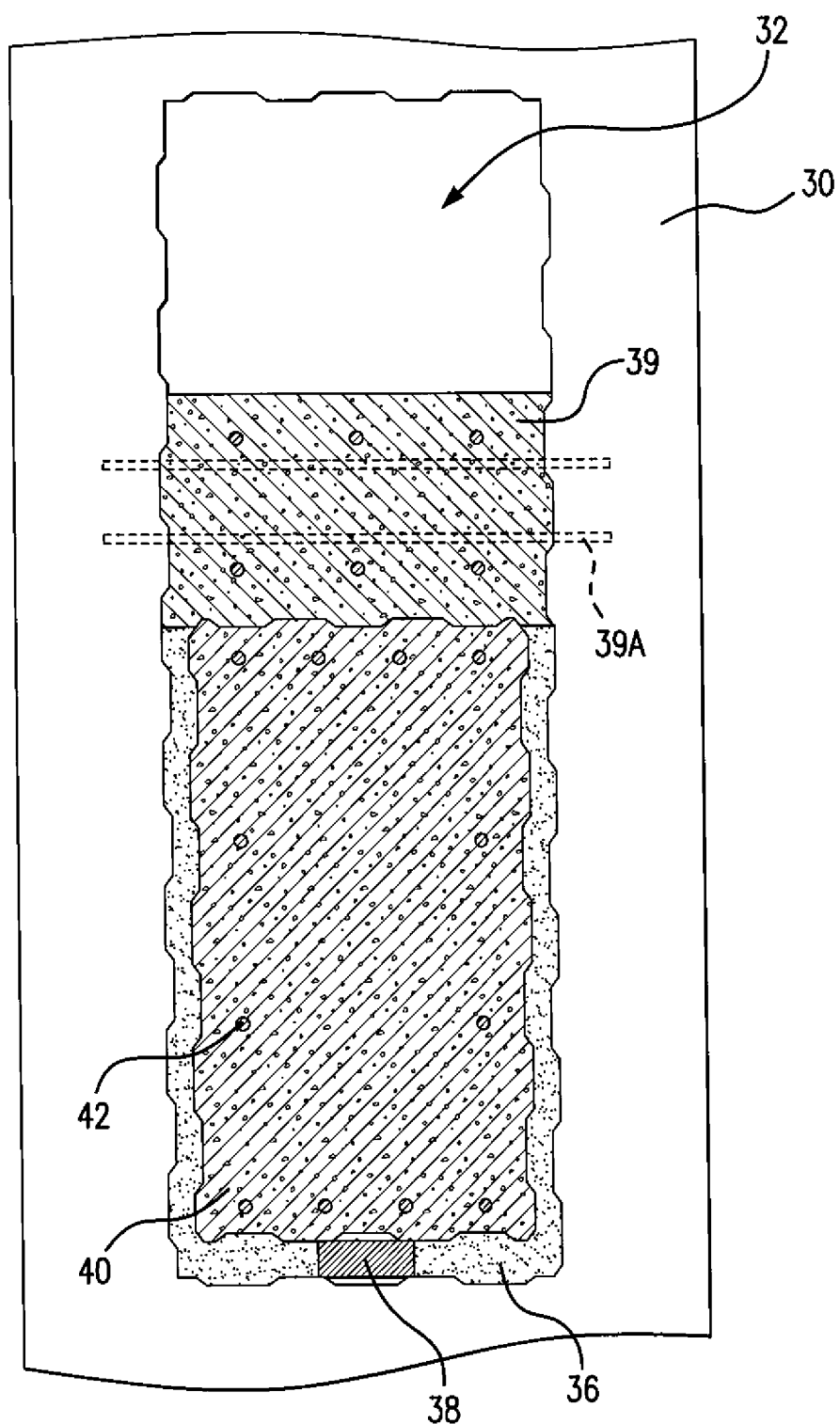
FIG. 7 is a side view of a second embodiment of the joint between the leg and the horizontal support.

Horizontal supports 40 may be joined to horizontal struts 150 and legs 30 by either of the joining methods shown in FIGS. 5 and 7.

Figure 4:
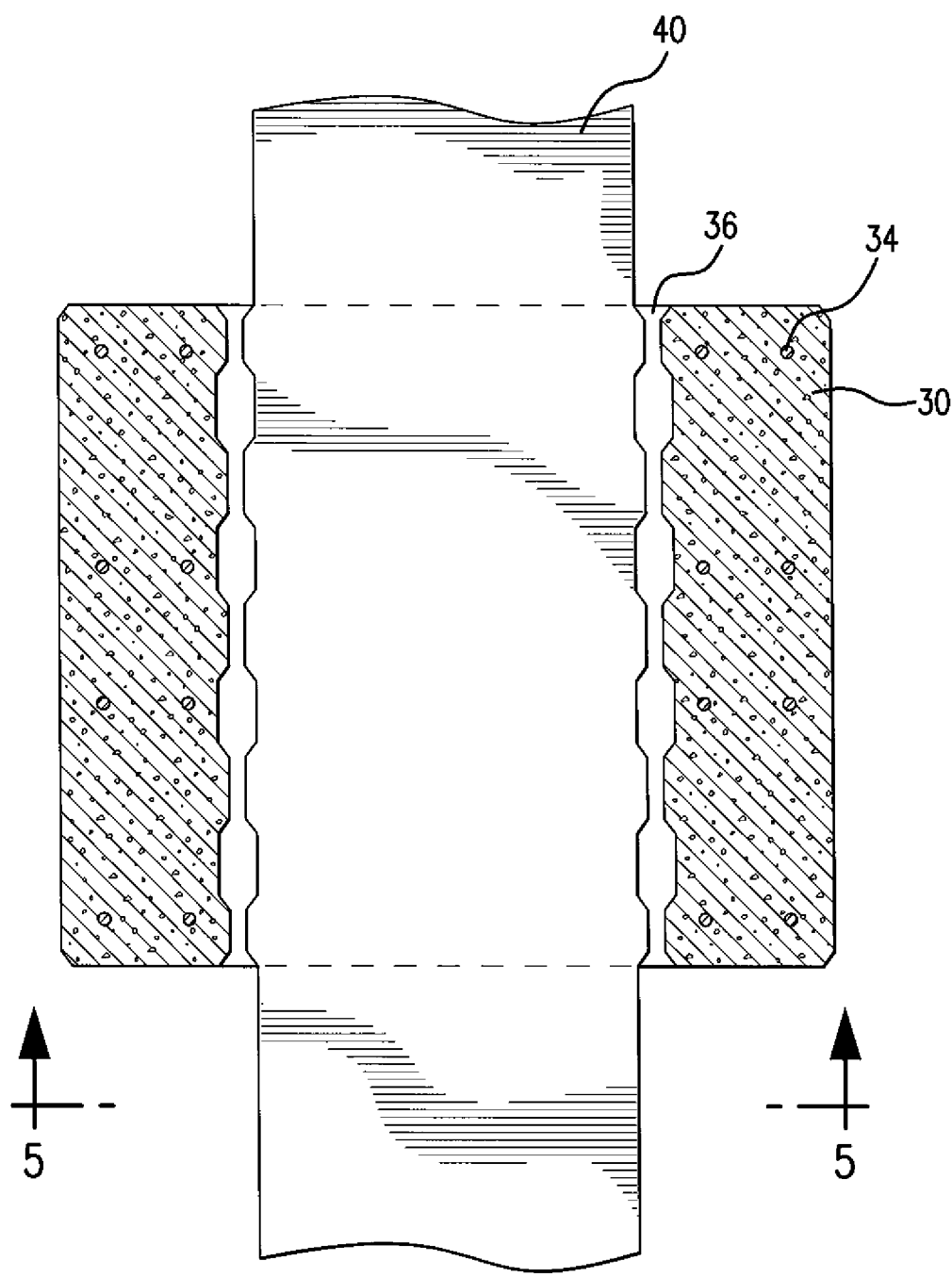
FIG. 4 is a top cutaway view of the joint between the leg and the horizontal support.

FIG. 4 shows a cut away top view of the joint between leg 30 and horizontal support 40. Leg 30 may have pre-stress strands 34 extending in the vertical direction. Both the inside of aperture 32 and the outside of the portion of horizontal support 40 that is received in aperture 32 may include shear key surfaces 31 and 41 to strengthen the adhesive bond between leg 30 and horizontal support 40. The volume between leg 30 and horizontal support 40 is filled with an adhesive 36, which may be an ultra-high performance concrete or grout. In one embodiment, leg 30 is 36 inches wide and 30 inches long (in the direction of the horizontal support 40).

FIG. 5 shows a side view of a first embodiment of the joint between leg 30 and horizontal support 40. In this embodiment, horizontal support 40 is surrounded on all sides by adhesive 36. The only gap in adhesive 36 is due to steel shim 38. In one embodiment, horizontal support 40 is 18 by 32 inches, and steel shim 38 is 4 by 4 inches in area and 2 inches thick. Thus, the steel shim lifts the horizontal support 40 off of the bottom of aperture 32 before the adhesive 36 is added to the space between the leg 30 and the horizontal support 40. This allows for a roughly even thickness of adhesive 36 around the four sides of the horizontal support 40. Horizontal support 40 may also include pre-stress strands 42 extending in the horizontal direction.

Accordingly, aperture 32 is significantly bigger than horizontal support 40. For example, aperture 32 may be 22 by 36 inches and support 40 may be 18 by 32 inches. Thus, roughly 2 inches of space on each side can be found between the aperture 32 and horizontal support 40. This equates to lateral dimensions of support 40 being 81-89% as big as the corresponding lateral dimensions of aperture 32. Supports 40 having dimensions from 50%-90% of the corresponding dimension of aperture 32 are within the scope of the invention. Further, cross-sectional areas of the support 40 are from 40%-75% of the cross-sectional area of aperture 32.

This space allows for significant adjustment of the configuration of the support 40 when connecting the support 40 to legs 30. Therefore, the location of foundations 20 does not need to be exact, as errors can be corrected by adjusting the amount of space between the support 40 and the aperture 32. The two inch allowance on each side of the support 40 described above allows for correcting errors of up to approximately 1.75 inches in the placement of foundations 20. In contrast, foundations for steel bents must be placed within a tolerance of 0.5 inches or less. Moreover, the present inventors discovered that there is a 1:0.9 ratio of the distance allowance between the support 40 and the aperture 32 and the distance tolerance for the foundations 20.

In this regard, FIGS. 1 and 2 show foundations 20, legs 30, horizontal support, and apertures 32 that are rectangular prisms. However, any other shapes or cross-sectional shapes for the foundations 20, legs 30, horizontal supports 40, struts 50, and apertures 32 are within the scope of the invention.

Figure 6:
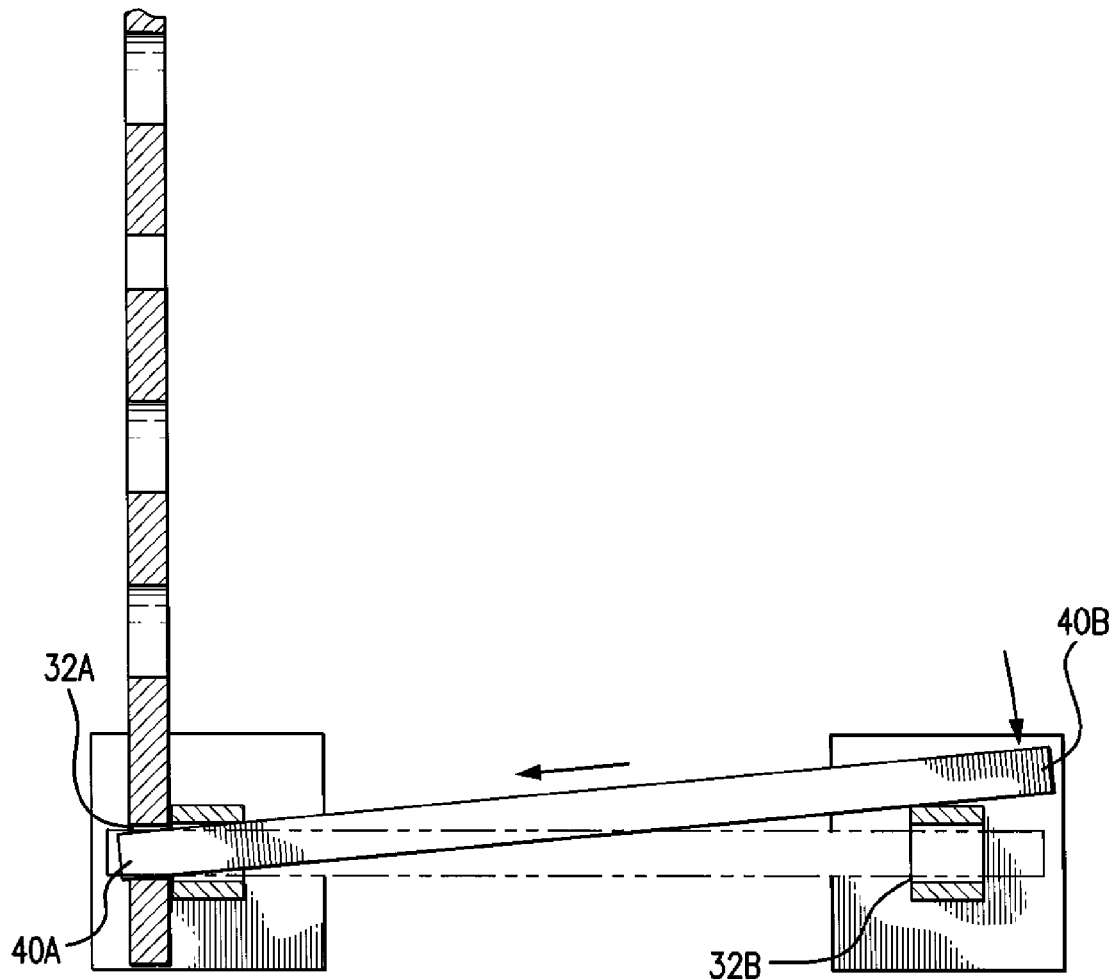
FIG. 6 is top view of the insertion process for inserting the horizontal support into the two legs.

FIG. 6 shows the process for constructing the present pipe racks. The foundations 20 are already placed and the legs 30 are inserted therein. The horizontal supports 40 are then inserted into the apertures 32 by inserting end 40A into aperture 32A, drawing the support 40 into the aperture 32A until the end 40B clears the opposite leg, and then moving the opposite end 40B into the aperture 32B of the opposite leg.

FIG. 7 shows a second embodiment of the joint between leg 30 and horizontal support 40. In this embodiment, aperture 32 is much longer in the height direction than support 40. Horizontal support 40 is then surrounded on only three sides by adhesive 36. (A steel shim may be used as shown in FIG. 5). Then an additional portion of concrete 39 is poured into the aperture 32 above the support 40. As shown in FIG. 7, reinforcement 39A can be placed in aperture 32 before pouring the additional concrete. The concrete portion 39 thus locks support 40 into place, while leaving the upper part of aperture 32 open. This additional space allows for even greater adjustment of the support 40 in the vertical direction. The vertical adjustment may be critical when the foundations 20 are being placed on ground that may be uneven.

Accordingly, pipe racks that are impervious to fire may be constructed with less labor and more adjustability, reducing cost and improving performance. Therefore, a substantial cost savings may be gained by using the present method and apparatus for constructing pipe racks.

The present written description uses examples to disclose the present subject matter, including the best mode, and also to enable any person skilled in the art to practice the present subject matter, including making and using any devices or systems and performing any incorporated and/or associated methods. While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

The invention claimed is:

1. A pipe rack comprising:
   at least one foundation;
   two legs, one of the two legs being supported by the at least one foundation, each of the two legs including at least one aperture;
   a horizontal support having two ends, a first end located in an aperture in a first leg of the two legs and a second end of the horizontal support being located in an aperture in a second leg of the two legs, the first end of the horizontal support having a cross-sectional area that is less than a cross-sectional area of the aperture in the first leg and the second end of the horizontal support having a cross-sectional area that is less than a cross-sectional area of the aperture in the second leg;
   an adhesive within each aperture and in contact with the horizontal support, the two legs and the horizontal support are all being made of concrete;
   at least a second foundation;
   a second set of two legs, one of the second set of two legs being supported by the second foundation;
   a horizontal strut extending between a first leg of the two legs and a first leg of the second set of two legs.

2. The pipe rack according to claim 1, wherein the at least one foundation, the two legs, and the horizontal support are all made of pre-stressed concrete.

3. The pipe rack according to claim 1, wherein a cross-sectional area of the first end of the horizontal support is 40-75% of a cross-sectional area of the aperture in the first leg.

4. The pipe rack according to claim 1, wherein the adhesive is a grout.

5. The pipe rack according to claim 1, wherein the adhesive is located around all sides of the horizontal support.

6. The pipe rack according to claim 1, wherein the horizontal support has a rectangular side cross-section, and adhesive is located around only three sides of the horizontal support.

7. The pipe rack according to claim 6, wherein concrete is located along a fourth side of the horizontal support.

8. The pipe rack according to claim 1, further comprising:
a second horizontal strut extending between a second leg of the two legs and a second leg of the second set of two legs; and
a second horizontal support having two ends, a first end of the second horizontal support being located in an aperture in the horizontal strut and a second end of the second horizontal support being located in an aperture in the second horizontal strut.

9. A method for constructing a pipe rack:
placing at least one foundation;
placing two legs, one of the two legs being supported by the at least one foundation, each of the two legs including at least one aperture;
inserting a first end of a horizontal support into an aperture in a first leg of the two legs and a second end of the horizontal support into an aperture in a second leg of the two legs, the first end of the horizontal support having a cross-sectional area that less than a cross-sectional area of the aperture in the first leg and the second end of the horizontal support having a cross-sectional area that is less than a cross-sectional area of the aperture in the second leg;
inserting an adhesive into each aperture, the two legs and the horizontal support are all being made of concrete;
placing at least a second foundation;
placing a second set of two legs, one of the second set of two legs being supported by the second foundation;
providing a horizontal strut extending between a first leg of the two legs and a first leg of the second set of two legs.

10. The method according to claim 9, wherein the adhesive is a grout.

11. The method according to claim 9, further comprising:
pouring concrete into each aperture over a top side of the horizontal support.

12. The method according to claim 11, wherein the pouring concrete does not completely fill each aperture with concrete.

13. The method according to claim 11, further comprising:
inserting reinforcement strands into each aperture above the top side of the horizontal support before the pouring concrete.

14. The method according to claim 9, further comprising:
placing a second horizontal strut extending between a second leg of the two legs and a second leg of the second set of two; and
inserting a second horizontal support having two ends into apertures in the horizontal strut and the second horizontal strut such that a first end of the second horizontal support is located in an aperture in the horizontal strut and a second end of the second horizontal support is located in an aperture in the second horizontal strut.

15. A pipe rack comprising:
at least one foundation;
two legs, one of the two legs being supported by the at least one foundation, each of the two legs including at least one aperture;
a horizontal support having two ends, a first end located in an aperture in a first leg of the two legs and a second end of the horizontal support being located in an aperture in a second leg of the two legs, the first end of the horizontal support having a cross-sectional area that is less than a cross-sectional area of the aperture in the first leg and the second end of the horizontal support having a cross-sectional area that is less than a cross-sectional area of the aperture in the second leg; and
a concrete layer within each aperture and in contact with the horizontal support, the two legs and the horizontal support are all being made of concrete;
at least a second foundation;
a second set of two legs, one of the second set of two legs being supported by the second foundation;
a horizontal strut extending between a first leg of the two legs and a first leg of the second set of two legs.

16. The pipe rack according to claim 15, wherein the concrete layer does not completely fill each aperture.

17. The pipe rack according to claim 15, further comprising:
a reinforcement strand within each aperture above the top side of the horizontal support, each end of the reinforcement strand penetrating opposite sides of the aperture and the reinforcement strand running through the concrete layer.

18. The pipe rack according to claim 15, further comprising:
an adhesive layer in the aperture around sides and a bottom of the horizontal support,
wherein the concrete layer is in contact with a top of the horizontal support.

* * * * *